Figure 1:
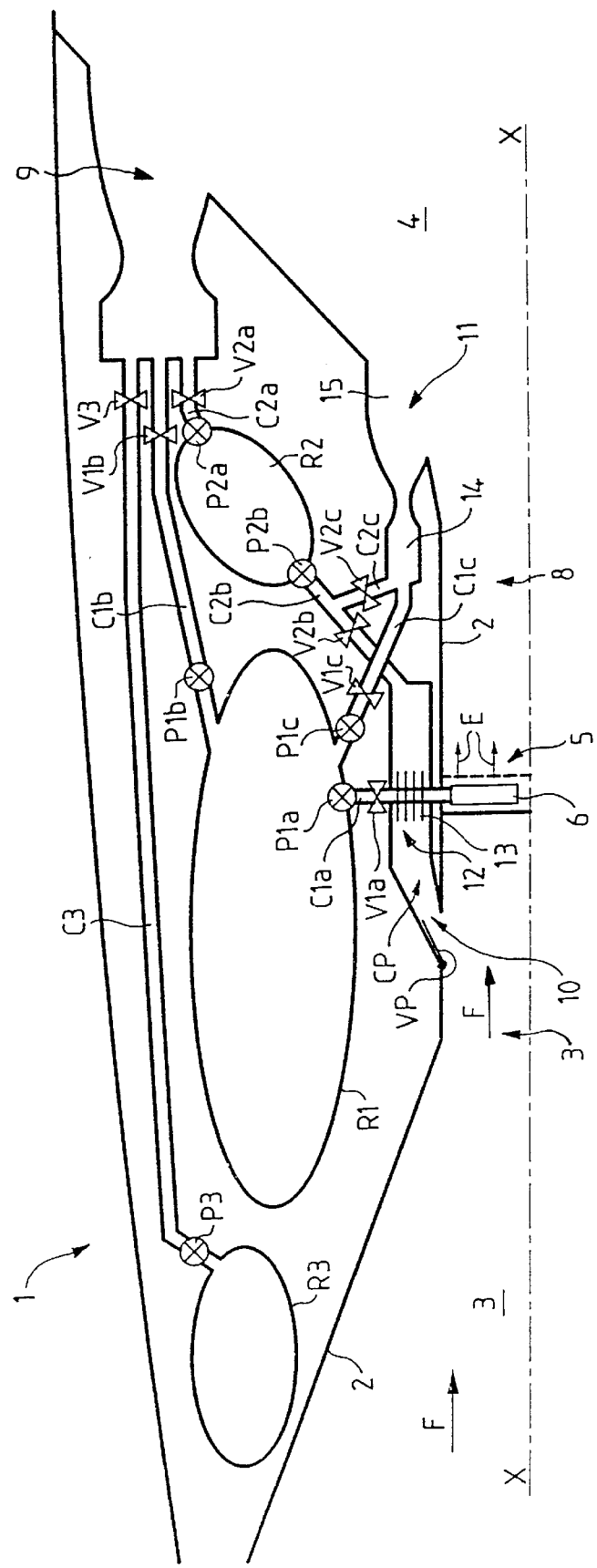

United States Patent
Bouchez

[11] Patent Number: 6,155,041
[45] Date of Patent: Dec. 5, 2000

[54] HYBRID ENGINE CAPABLE OF EMPLOYING AT LEAST A RAMJET MODE AND A SUPER RAMJET MODE

[75] Inventor: Marc Bouchez, Bourges, France

[73] Assignee: Aerospatiale Societe Nationale Industrielle, Paris, France

[21] Appl. No.: 09/253,529

[22] Filed: Feb. 22, 1999

[30] Foreign Application Priority Data

Feb. 27, 1998 [FR] France .................................. 98 02420

[51] Int. Cl.⁷ ...................................................... F02K 7/08
[52] U.S. Cl. ............................................ 60/270.1; 60/245
[58] Field of Search .................................. 60/270.1, 224, 60/244, 245, 269

[56] References Cited

U.S. PATENT DOCUMENTS

| | | | |
|---|---|---|---|
| 3,690,102 | 9/1972 | Du Pont | ..................................... 60/269 |
| 5,135,184 | 8/1992 | Billig . | |
| 5,167,117 | 12/1992 | Herzog et al. . | |
| 5,191,761 | 3/1993 | Janeke . | |

FOREIGN PATENT DOCUMENTS 2701293   8/1994   France .

*Primary Examiner*—Charles G. Freay
*Assistant Examiner*—Ehud Gartenberg
*Attorney, Agent, or Firm*—Stevens, Davis, Miller & Mosher, L.L.P.

[57] ABSTRACT

The present invention relates to a hybrid engine capable of employing a ramjet mode and a super ramjet mode and comprising a main engine system (3, 4, 5, 8) which burns fuel and which comprises at least one air inlet (3) for an air stream (F), a combustion chamber (8) and a jetpipe (4). According to the invention, said engine (1) additionally comprises first means (10) for storing, in ramjet mode, air diverted from the air stream (F), and second means (11) for burning, in super ramjet mode, some of a fuel of the engine (1) with the air stored by the first means (10), before injecting it into the main engine system (3, 4, 5, 8).

10 Claims, 6 Drawing Sheets

HYBRID ENGINE CAPABLE OF EMPLOYING AT LEAST A RAMJET MODE AND A SUPER RAMJET MODE

The present invention relates to a hybrid engine capable of employing at least a ramjet mode and a super ramjet mode.

In the context of the present invention, such a hybrid engine is a very high performance aerobic engine operating over a broad range of speeds, for example from Mach 2 to Mach 12:

initially, in pure subsonic combustion (representing said ramjet mode) for speeds of between, for example, Mach 2 and Mach 6;
  and then, in supersonic combustion (representing said super ramjet mode) for speeds of between, for example, Mach 6 and Mach 12.

In particular, owing to the potential broad operating range and a low specific fuel consumption, hybrid engines of the aforementioned type are particularly well suited to the propulsion of hypersonic flying objects (missiles, aeroplanes, etc.). Depending on the application, and possibly on the phase of flight in question of the flying object, the fuel used may be a liquid hydrocarbon, such as kerosene, or a gas, such as hydrogen and methane, the oxidizing agent being air.

As is known, such a hybrid engine comprises at least one main engine system which burns fuel and which comprises at least one air inlet for an air stream, a main combustion chamber and a main jet pipe, in ramjet mode some of the air tapped off by an air bleed being diverted from the air stream before it enters said combustion chamber. This air (or "boundary layer"), which is usually diverted using one or more "boundary layer bleeds" (to use the term of the art for engines and propulsion motors), flows along close to the walls of the air bleed and has low energy.

A significant disadvantage of such a hybrid engine is that in super ramjet mode, the thrust provided by the engine is often insufficient, particularly to reach very high speeds, especially those above Mach 10.

It is known that, for such high speeds, the contribution of the energy and of the momentum of the fuel injected, generally hydrogen, plays an important part in the propulsion. In addition, the fuel is often injected with a mixture ratio higher than the stoichiometric value. Thus, in order to increase the engine performance, there is an advantage to be had in injecting the fuel as hot as possible.

A usual solution for heating up the fuel is to use the engine cooling circuit. The fuel therefore circulates through the walls of the engine, cooling them and becoming heated therein.

However, such heating is limited, particularly by the heat supplied for the flow of hot gases through the engine, by constraints associated with the cooling circuit (efficiency, etc.) and the maximum temperature of the hot skin of the engine components, which has to be below the permissible operating temperature for the material of which the walls are made.

This known solution for heating up the fuel is therefore hardly satisfactory.

The object of the present invention is to overcome these drawbacks. The invention relates to a hybrid engine of the aforementioned type in which, using simple and inexpensive means, the thrust and performance in super ramjet mode are considerably increased.

To this end, according to the invention, said hybrid engine is noteworthy in that it additionally comprises:

first means for storing, in ramjet mode, the air thus diverted; and
  second means for burning, in super ramjet mode, some of a fuel of said engine with the air stored by said first means, before injecting it into said main engine system.

Thus, by the virtue of the invention, it is possible to considerably increase the thrust and performance of the hybrid engine by burning some of the fuel, for example, the hydrogen, with the air stored, so as, in particular, to heat up the rest of the fuel.

A numerical example may be given in order to clearly demonstrate the advantages obtained by the present invention. It is known that at Mach 12, if the fuel (hydrogen) which is usually injected at 1000 K is heated to 1500 K, then the engine thrust is increased by 15% and the specific fuel consumption of said engine is reduced by 15%, whereas the specific impulse of the vehicle equipped with said hybrid engine is increased by 20 to 25%. Now, heating to such a temperature can easily be achieved using the invention.

In addition to the heating of the hydrogen, the inertia of the additional liquid air also leads to an increase in engine performance in super ramjet mode.

What is more, the invention provides a solution for the use of the diverted air (from the "boundary layer") which, in conventional engines, requires special means for ejecting it from the engine, and which must not disrupt the operation of the latter.

Furthermore, advantageously, said first means comprise means for cooling and liquefying the diverted air and at least one storage tank for storing the air thus liquefied.

In addition, as a preference:

said means for liquefying the air comprise at least one exchanger using a fuel of the engine; and
  said exchanger additionally uses an auxiliary fluid intended, in the event of leaks, to prevent any contact between the air and said fuel.

Furthermore, advantageously, said second means comprise at least one auxiliary combustion chamber equipped with at least one secondary jetpipe.

In this case, there are various envisagable embodiments. In particular, advantageously:

said secondary jetpipe is designed to open into said main combustion chamber and/or into said main jetpipe; and
  in the case of an engine comprising at least one injection device for injecting a fuel into an injection chamber that lies upstream of the main combustion chamber in the direction in which the air flows, said auxiliary combustion chamber is arranged in said injection device and said secondary jetpipe opens into said injection chamber.

In this last embodiment, the engine preferably comprises a number of auxiliary combustion chambers arranged in said injection device, which makes it possible to homogenize and/or amplify the combustion.

Incidentally, in an advantageous embodiment, the hybrid engine in accordance with the invention additionally incorporates an accelerator mode, for at least an initial acceleration, in which mode combustion is performed using oxidizing agent, for example oxygen, stored in an oxidizing-agent tank, and said diverted-air storage tank corresponds to said oxidizing-agent tank, which is at least partially emptied after the initial acceleration and can thus receive the air diverted in ramjet mode. It is therefore not necessary to provide an additional tank specifically for storing the diverted air, which is advantageous in terms of cost and bulk.

The figures of the appended drawing will make it easy to understand how the invention may be achieved. In these figures, identical references denote similar elements.

FIG. 1 diagrammatically shows a hybrid engine in accordance with the invention.

FIGS. 2 to 6 illustrate various successive phases of operation of the hybrid engine of FIG. 1.

The hybrid engine 1 in accordance with the invention and depicted diagrammatically in FIG. 1 is intended to propel a hypersonic flying object (missile, aeroplane, etc.) not depicted and intended to fly at a road range of Mach numbers, for example from a zero Mach number up to a Mach number of the order of 12 to 15.

Said hybrid engine 1 is a very high performance aerobic engine which, in the known way, comprises a casing 2 which has symmetry of revolution with respect to an axis X—X and is equipped, at one of its ends, with an air intake 3 for an air stream (symbolized by an arrow F) which is to act as oxidizing agent and, at its opposite end, a jetpipe 4.

Downstream of the air intake 3, the casing 2 forms an injection chamber 5 inside which there is an injection device 6 of known type comprising, for example, one or more injection masts, not depicted.

Said injection device 6, via a feed pipe C1a equipped with a pump P1a and a valve V1a, draws fuel from a tank R1, in which it is stored, and injects into said injection chamber 5, as illustrated by arrows E.

Furthermore, between the injection chamber 5 and the jet pipe 4, the casing 2 delimits a combustion chamber 8, at the upstream part of which there are igniters, not depicted.

Thus, the injected fuel is distributed throughout the stream F of oxidizing agent, in the region of the injection device 6, and combustion of the flow of oxidizing agent/fuel mixture occurs in the combustion chamber 8, after which the combustion gases are ejected through the jetpipe 4.

It will be noted that, as fuel, use may be made of kerosene for the lower flight Mach numbers (up to Mach 8) (possibly with an injection of hydrogen to make igniting the ramjet easier and encourage jet pluming), then of hydrogen for the higher Mach numbers. Other fuels, such as methane, endothermic hydrocarbons, synthetic fuels, may also be used in a hybrid engine of this type.

However, in the preferred embodiment depicted and described below in FIG. 1, the fuel stored in the tank R1 is hydrogen.

The hybrid engine 1 thus formed can operate:
initially in pure subsonic combustion (representing a ramjet mode) for speeds of between, for example, Mach 2 and Mach 6;
thereafter, in supersonic combustion (representing a super ramjet mode) for speeds of between, for example, Mach 6 and Mach 12.

It will be noted that the aforementioned means 3, 4, 5 and 8 form a main engine system of the engine 1.

According to the invention, said hybrid engine 1 additionally incorporates an accelerator mode operated by a rocket engine 9 of the usual type.

Said rocket engine 9 is capable of causing:
initial acceleration up to about Mach 2, by burning hydrogen from the tank R1 and received via a feed pipe C1b equipped with a pump P1b and a valve V1b, with oxidizing agent (oxygen) stored in a tank R2 and received via a feed pipe C2a equipped with a pump P2a and a valve V2a; and possibly
a terminal acceleration, beyond about Mach 12, by burning hydrogen from the tank R1 with oxidizing agent (oxygen) stored in a tank R3 and received via a feed pipe C3 equipped with a pump P3 and valve V3.

The engine 1 as specified earlier is improved according to the invention so that its thrust and performance are considerably increased in super ramjet mode.

To achieve this, according to the invention, said engine 1 additionally comprises:
means 10 for storing, in ramjet mode, air diverted from the main air stream F. It will be noted that this diverted air, which is air which flows close to the walls of the air intake 3 and has low energy, is troublesome and is generally removed, in conventional engines, using "boundary-layer bleeds"; and
means 11 for burning, in super ramjet mode, fuel stored in the tank R1 with the air diverted and stored by said means 10, before injecting it into the main engine system.

Depending on the embodiment, this injection may take place into the injection chamber 5, into the combustion chamber 8 or into the jetpipe 4.

Thus, by burning some of the hydrogen from the tank R1 with the stored air, in super ramjet mode, the temperature of the remaining hydrogen which is burnt in the conventional way in the combustion chamber 8, is increased.

As a result, the present invention involves a supply of energy, which considerably increases the thrust and performance of the engine 1 in super ramjet mode.

The performance is also increased by the inertia of the additional liquid air used in accordance with the present invention.

Said means 10 comprise:
a pipe CP for tapping off the diverted air, which pipe is connected to a feed pipe C2b equipped with a pump P2b and a valve V2b of the tank R2. Said tapping pipe CP opens out near the air intake 3 and at that point is equipped with a valve VP (or a mobile flap) which can be opened or closed; and
means 12 of a known type for cooling and liquefying the diverted air before storing it inside said tank R2.

To this end, said means 12 comprise:
at least one exchanger 13 which uses hydrogen received from the tank R1 through the pipe C1a. According to the invention, said exchanger 13 additionally uses an auxiliary fluid, for example helium, intended to avoid any contact between the air and the fuel in the event of leaks;
the pump P2b or a pressure-raising device; and
the valve V2b.

Furthermore, the aforementioned means 11 comprise:
a combustion chamber 14 connected to the tanks R1 and R2 respectively via a feed pipe C1c (equipped with a pump P1c and a valve V1c) and a pipe C2c (equipped with a valve V2c and connected to the pipe C2b); and
a jetpipe 15 arranged at the exit of said combustion chamber 14.

In the embodiment depicted in FIG. 1, said jetpipe 15 opens into the jetpipe 4.

In another embodiment, not depicted, said jetpipe 15 may also open into the combustion chamber 8 or into the injection chamber 5.

Furthermore, in the context of the present invention, the means 11 may comprise a number of combustion chambers 14 and/or of jetpipes 15.

The various successive phases of operation of the engine 1, from a standstill up to a maximum Mach number of the order of 15 are specified hereafter with reference to FIGS. 2 to 6; these phases are:
an initial acceleration phase, for example up to Mach 2;

a phase in ramjet mode, for example up to Mach 6;

phase in super ramjet mode, for example up to Mach 12; and a terminal acceleration phase.

It will be noted that initially, the tank R1 is full of fuel (hydrogen) and the tanks R2 and R3 are full of oxidizing agent (oxygen). Flows of oxidizing agent will be indicated below by arrows F and flows of fuel will be indicated below by arrows E, followed by numerals allowing them to be differentiated.

Figure 2:
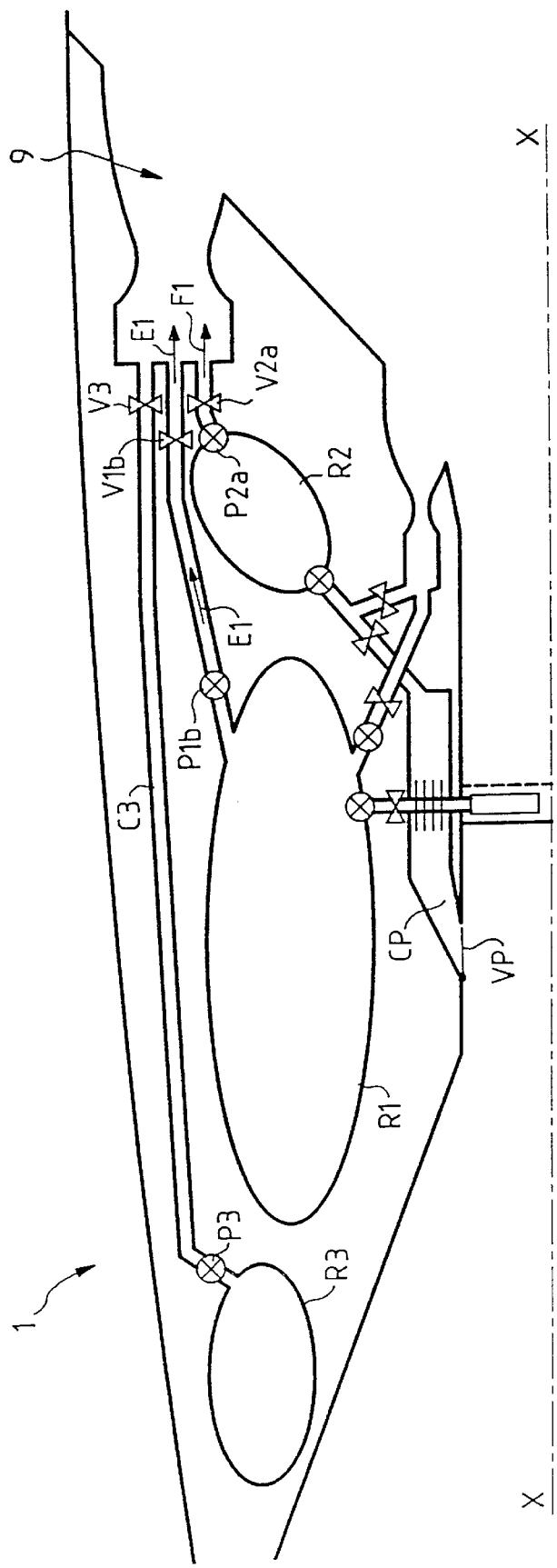

In the initial acceleration phase, only the rocket engine 9 operates and it burns hydrogen from the tank R1, as illustrated by arrows E1 in FIG. 2, with oxygen from the tank R2, as illustrated by an arrow F1.

In consequence, only the valves V1b and V2a are open and only the pumps P1b and P2a are operating, while the other valves of the engine 1 are closed and the other pumps are switched off.

In addition, the valve VP in the pipe Cp may:

either be open so as to act as a boundary layer bleed, allowing removal, not depicted, of the diverted air;

or be closed, as depicted in FIG. 2.

Figure 3:
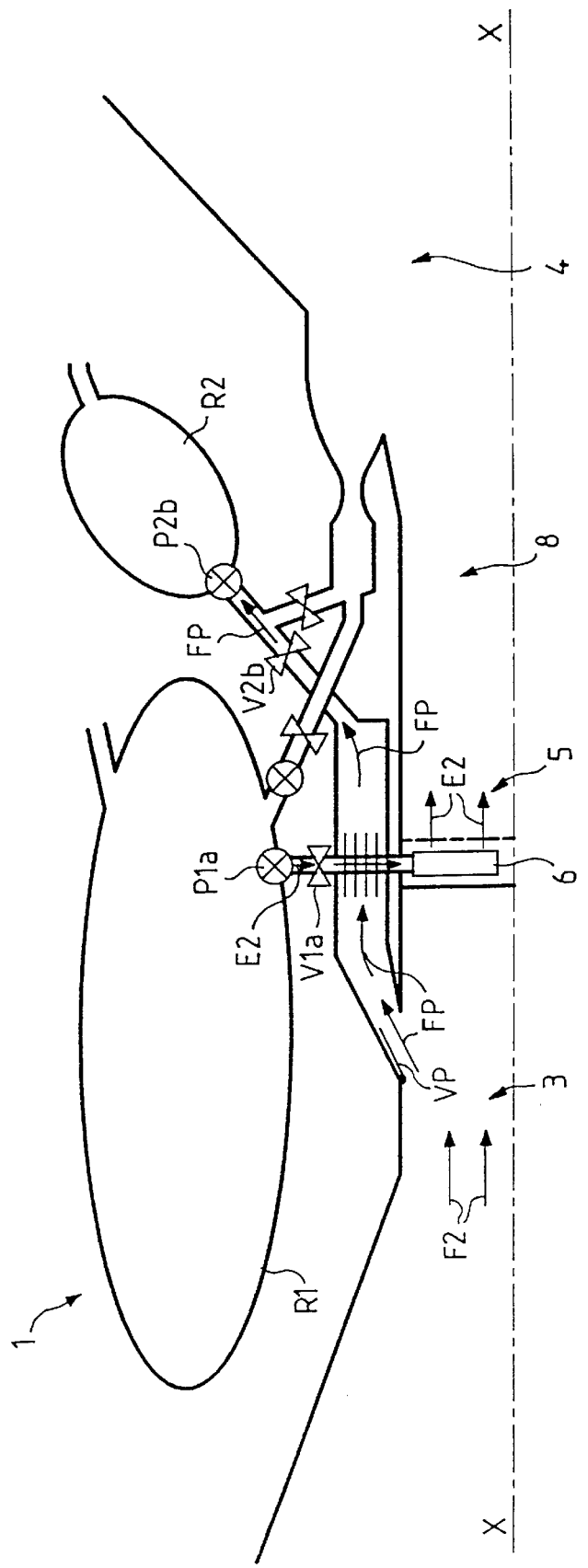

In the next phase of ramjet mode, the engine 1 operates in the usual way, as depicted in FIG. 3, burning in the combustion chamber 8 hydrogen that is injected into the injection chamber 5, as shown by arrows E2, with air from the main stream, illustrated by arrows F2.

In addition, in accordance with the invention, the valve VP is open and some of the air (the boundary layer) of said main stream F2 is diverted, as shown by arrows FP, and is stored in the tank R2 which has been at least partially emptied during the initial acceleration.

In this second phase, only the valves V1a, V2b and VP are open and only the pumps P1a and P2b are operating.

At the end of this second phase, the valve VP is closed so that air is no longer diverted, and so is the valve V2b associated with the tank R2.

Figure 4:
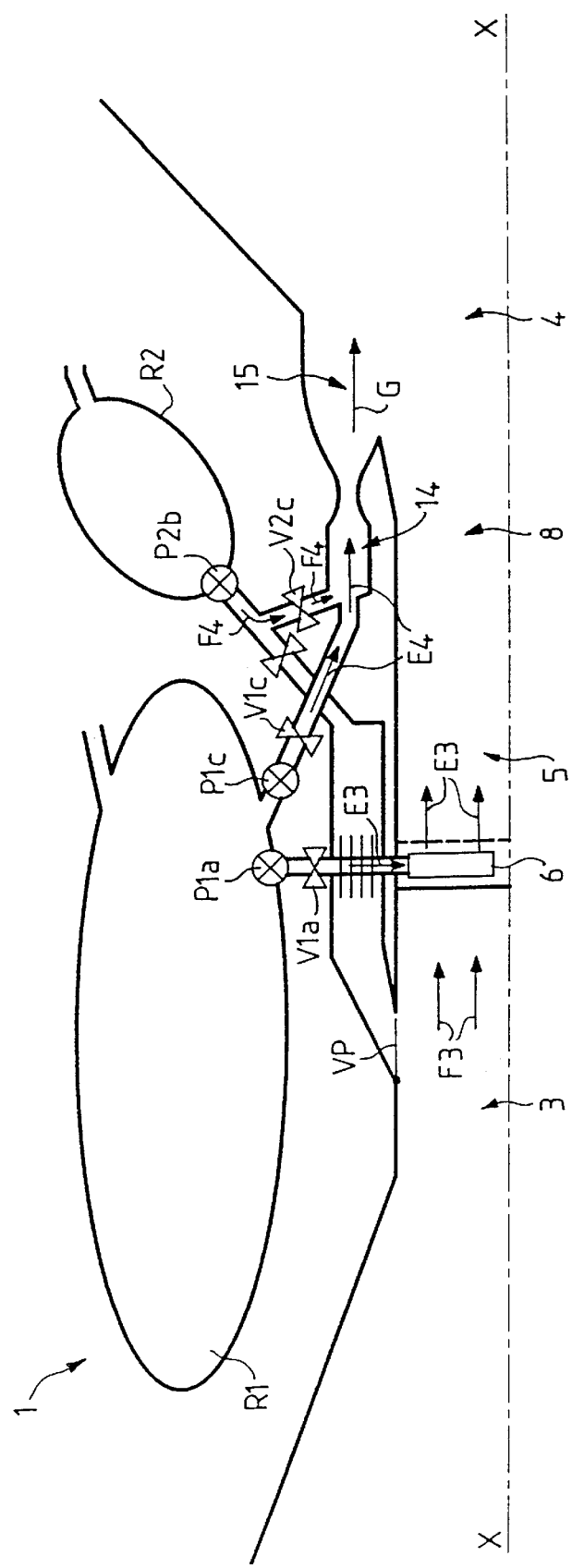

The next phase in super ramjet mode can be split into two subphases:

a first subphase which corresponds to usual operation in super ramjet mode. Hydrogen from the tank R1 is burnt in the combustion chamber 8 with the air of the main stream, as illustrated by arrows E3 and F3 in FIG. 4; and a second subphase, in which in addition to the elements of the first subphase, the means 11 are also operated, as also depicted in FIG. 4.

To do this, hydrogen from the tank R1, as illustrated by arrows E4 is burnt in the combustion chamber 14 with air from the tank R2, as illustrated by arrows F4. The gases obtained from this combustion are injected into the jetpipe 4 via the jetpipe 15, as illustrated by an arrow G.

In this case, only the valves V1a, V1c and V2c are open; and only the pumps P1a, P1c and P2b are operating.

Figure 5:
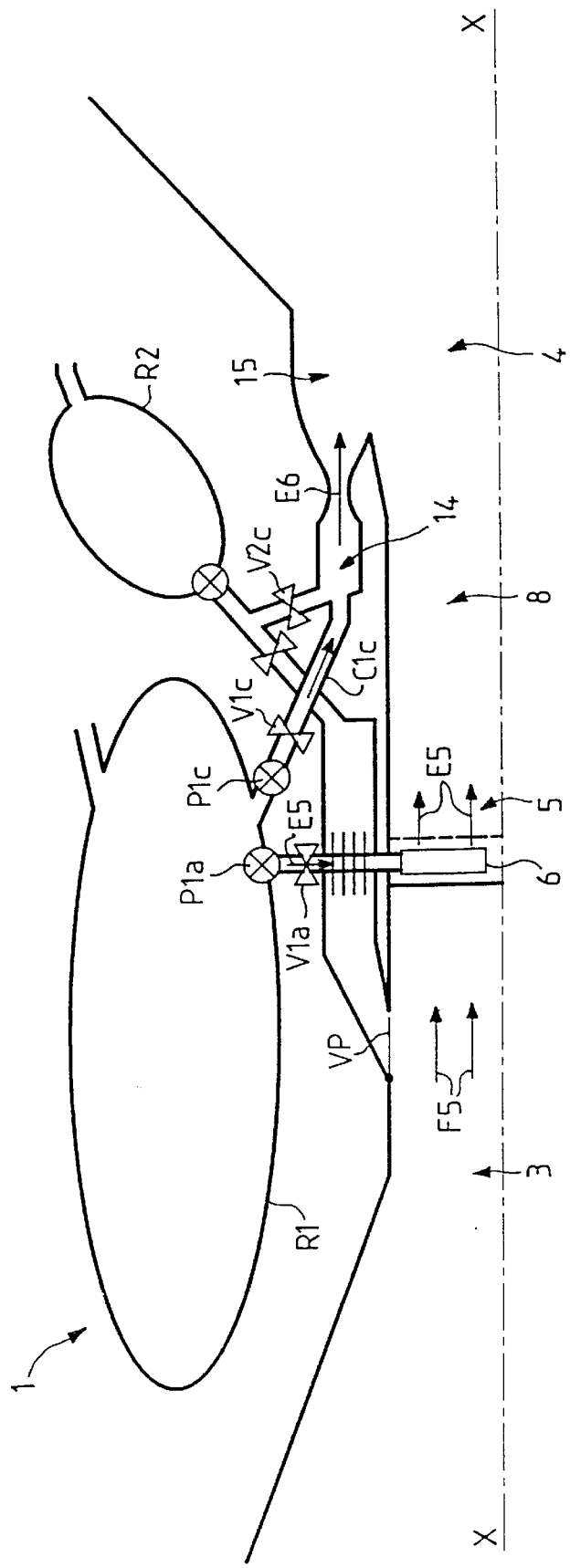

In super ramjet mode, the engine 1 can also operate by performing combustion using two injection zones, as depicted in FIG. 5, without using the air from the tank R2.

To achieve this, hydrogen from the tank R1 is injected:

on the one hand, into the injection chamber 5, as illustrated by arrows E5; and on the other hand, into the jetpipe 4, via the pipe C1c, the chamber 14 and the jetpipe 15, as illustrated by arrows E6.

This hydrogen is burnt with air from the main stream F5.

In this embodiment, the valve V2c is closed and no combustion takes place in the chamber 14.

Figure 6:
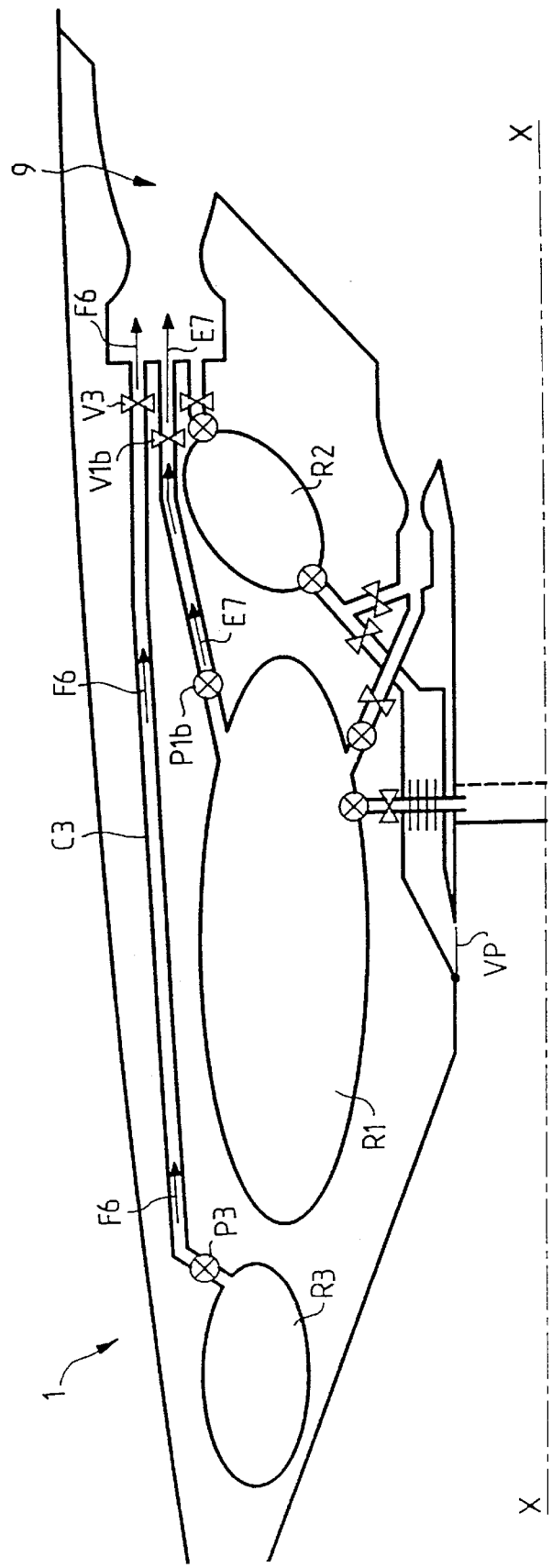

Finally, the present invention also allows terminal acceleration to be implemented, as depicted in FIG. 6, in which only the rocket engine 9 is in operation and burns hydrogen from the tank R1 (arrows E7) with oxygen from the tank R3 (arrows F6).

In this case, only the valves V1b and V3 are open and only the pumps P1b and P3 are operating.

It will additionally be noted that, in the context of the present invention, the engine 1 may comprise a number of hydrogen tanks, used simultaneously or in turn.

What is claimed is:

1. A hybrid engine capable of employing at least a ramjet mode and a super ramjet mode and comprising at least one main engine system (3, 4, 5, 8) which burns fuel and which comprises at least one air inlet (3) for an air stream (F), a main combustion chamber (8) and a main jetpipe (4), in ramjet mode, some of the air tapped by said air bleed (3) being diverted from the air stream (F) before it enters said combustion chamber (8), which additionally comprises:

first means (10) for storing, in ramjet mode, the air thus diverted; and second means (11) for burning, in super ramjet mode, some of a fuel of said engine (1) with the air stored by said first means (10), before injecting it into said main engine system (3, 4, 5, 8).

2. The engine as claimed in claim 1, wherein said first means (10) comprise means (12) for cooling and liquefying the diverted air and at least one storage tank (R2) for storing the air thus liquefied.

3. The engine as claimed in claim 2, wherein said means (12) for liquefying the air comprise at least one exchanger (13) using a fuel of the engine (1).

4. The engine as claimed in claim 3, wherein said exchanger (13) additionally uses an auxiliary fluid intended, in the event of leaks, to prevent any contact between the air and said fuel.

5. The engine as claimed in claim 1, wherein said second means (11) comprise at least one auxiliary combustion chamber (14) equipped with at least one secondary jetpipe (15).

6. The engine as claimed in claim 5, wherein said secondary jetpipe is designed to open into said main combustion chamber (8).

7. The engine as claimed in claim 5, wherein said secondary jetpipe (15) is designed to open into said main jetpipe (4).

8. The engine as claimed in claim 5, comprising at least one injection device (6) for injecting a fuel into an injection chamber (5) that lies upstream of the main combustion chamber (8) in the direction in which the air (F) flows, wherein said auxiliary combustion chamber is arranged in said injection device (6) and wherein said secondary jetpipe opens into said injection chamber (5).

9. The engine as claimed in claim 8, which comprises a number of auxiliary combustion chambers arranged in said injection device (5).

10. The engine as claimed in claim 1, which additionally incorporates an accelerator mode, for at least an initial acceleration, in which mode combustion is performed using oxidizing agent stored in an oxidizing-agent tank (R2), and wherein said diverted-air storage tank (R2) corresponds to said oxidizing-agent tank (R2).

* * * * *